(12) United States Patent
Fisher

(10) Patent No.: US 11,599,865 B2
(45) Date of Patent: **\*Mar. 7, 2023**

(54) METHOD AND SYSTEM FOR REMOTE TRANSACTION PROCESSING USING A NON-BROWSER BASED APPLICATION

(71) Applicant: Michelle Fisher, Berkeley, CA (US)

(72) Inventor: Michelle Fisher, Berkeley, CA (US)

(73) Assignee: Michelle Fisher, Berkeley, CA (US)

( \* ) Notice: Subject to any disclaimer, the term of this patent is extended or adjusted under 35 U.S.C. 154(b) by 177 days.

This patent is subject to a terminal disclaimer.

(21) Appl. No.: 16/906,239

(22) Filed: Jun. 19, 2020

(65) Prior Publication Data

US 2021/0035079 A1    Feb. 4, 2021

Related U.S. Application Data

(63) Continuation of application No. 15/822,131, filed on Nov. 25, 2017, now Pat. No. 10,692,063, which is a
(Continued)

(51) Int. Cl.
*G06Q 20/20* (2012.01)
*H04W 4/21* (2018.01)
(Continued)

(52) U.S. Cl.
CPC ............ *G06Q 20/20* (2013.01); *G06Q 20/00* (2013.01); *G06Q 20/108* (2013.01); *G06Q 20/16* (2013.01);
(Continued)

(58) Field of Classification Search
CPC ........ G06Q 20/00; G06Q 20/20; G06Q 20/32; G06Q 20/102; G06Q 20/105; G06Q 40/00;
(Continued)

(56) References Cited

U.S. PATENT DOCUMENTS

| 5,930,764 A | \* | 7/1999 | Melchione | ............. | G06Q 30/02 |
| | | | | | 705/7.29 |
| 6,018,654 A | \* | 1/2000 | Valentine | ............... | H04W 8/245 |
| | | | | | 455/414.4 |

(Continued)

FOREIGN PATENT DOCUMENTS

| EP | 1503352 | 7/2004 |
| WO | WO 2006095212 A1 | 9/2006 |

(Continued)

OTHER PUBLICATIONS

U.S. Appl. No. 15/076,578, Board Decision mailed Mar. 2, 2020, p. 7-9.

(Continued)

*Primary Examiner* — Olusegun Goyea

(57) ABSTRACT

A method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

40 Claims, 4 Drawing Sheets

Related U.S. Application Data continuation of application No. 14/686,695, filed on Apr. 14, 2015, now Pat. No. 9,836,731, which is a continuation of application No. 13/710,646, filed on Dec. 11, 2012, now Pat. No. 9,015,064, which is a continuation of application No. 11/948,903, filed on Nov. 30, 2007, now Pat. No. 8,352,323.

(51) Int. Cl.

| | | |
|---|---|---|
| *G06Q 30/0207* | (2023.01) | |
| *G06Q 30/06* | (2023.01) | |
| *H04M 1/72445* | (2021.01) | |
| *G06Q 20/32* | (2012.01) | |
| *G06Q 30/0238* | (2023.01) | |
| *G06Q 30/02* | (2023.01) | |
| *G06Q 20/38* | (2012.01) | |
| *G06Q 20/40* | (2012.01) | |
| *G06Q 20/36* | (2012.01) | |
| *G06Q 20/16* | (2012.01) | |
| *G06Q 20/00* | (2012.01) | |
| *G06Q 20/10* | (2012.01) | |
| *G06Q 30/0251* | (2023.01) | |
| *G06Q 30/0601* | (2023.01) | |
| *H04W 8/20* | (2009.01) | |
| *H04W 4/18* | (2009.01) | |
| *H04B 5/00* | (2006.01) | |
| *G06Q 40/12* | (2023.01) | |
| *G06Q 40/10* | (2023.01) | |
| *H04W 4/80* | (2018.01) | |
| *H04W 4/029* | (2018.01) | |
| *H04N 21/81* | (2011.01) | |
| *G07F 7/10* | (2006.01) | |
| *G06Q 40/00* | (2023.01) | |
| *H04W 88/02* | (2009.01) | |
| *H04W 4/02* | (2018.01) | |

(52) U.S. Cl.
CPC ......... *G06Q 20/202* (2013.01); *G06Q 20/204* (2013.01); *G06Q 20/206* (2013.01); *G06Q 20/32* (2013.01); *G06Q 20/322* (2013.01); *G06Q 20/325* (2013.01); *G06Q 20/326* (2020.05); *G06Q 20/3223* (2013.01); *G06Q 20/3226* (2013.01); *G06Q 20/3227* (2013.01); *G06Q 20/3255* (2013.01); *G06Q 20/3278* (2013.01); *G06Q 20/3674* (2013.01); *G06Q 20/382* (2013.01); *G06Q 20/3821* (2013.01); *G06Q 20/40* (2013.01); *G06Q 20/409* (2013.01); *G06Q 20/4012* (2013.01); *G06Q 20/4014* (2013.01); *G06Q 30/02* (2013.01); *G06Q 30/0222* (2013.01); *G06Q 30/0238* (2013.01); *G06Q 30/0251* (2013.01); *G06Q 30/0253* (2013.01); *G06Q 30/0255* (2013.01); *G06Q 30/0267* (2013.01); *G06Q 30/0268* (2013.01); *G06Q 30/06* (2013.01); *G06Q 30/0613* (2013.01); *G06Q 30/0635* (2013.01); *G06Q 40/10* (2013.01); *G06Q 40/12* (2013.12); *H04B 5/0025* (2013.01); *H04M 1/72445* (2021.01); *H04W 4/18* (2013.01); *H04W 4/21* (2018.02); *H04W 8/205* (2013.01); *G06Q 20/10* (2013.01); *G06Q 20/105* (2013.01); *G06Q 40/00* (2013.01); *G07F 7/1008* (2013.01); *H04N 21/812* (2013.01); *H04W 4/02* (2013.01); *H04W 4/029* (2018.02); *H04W 4/80* (2018.02); *H04W 88/02* (2013.01)

(58) Field of Classification Search
CPC .......... G06Q 40/10; G06Q 99/00; G06K 5/00; G06K 7/08; G06K 7/10237; G06K 15/00; H04W 12/12; H04W 4/24
USPC ...................... 455/41.1, 406–10, 556.1, 558; 235/375–385, 451, 462, 492; 705/16, 18, 705/30, 40, 41, 44, 64
See application file for complete search history.

(56) References Cited

U.S. PATENT DOCUMENTS

| | | | |
|---|---|---|---|
| 6,038,367 A | 3/2000 | Abecassis | |
| 6,075,971 A * | 6/2000 | Williams | H04N 7/165 725/23 |
| 6,101,483 A * | 8/2000 | Petrovich | G06Q 20/343 705/26.8 |
| 6,115,601 A * | 9/2000 | Ferreira | H04M 17/20 455/406 |
| 6,123,259 A * | 9/2000 | Ogasawara | G06Q 30/0267 705/14.1 |
| 6,128,655 A | 10/2000 | Fields | |
| 6,141,666 A | 10/2000 | Tobin | |
| 6,199,082 B1 | 3/2001 | Ferrel | |
| 6,250,557 B1 * | 6/2001 | Forslund | G06Q 20/229 235/375 |
| 6,394,341 B1 * | 5/2002 | Makipaa | G06Q 20/322 235/379 |
| 6,415,156 B1 | 7/2002 | Stadelmann | |
| 6,450,407 B1 * | 9/2002 | Freeman | G06K 19/0723 235/487 |
| 6,466,203 B2 | 10/2002 | Van Ee | |
| 6,587,835 B1 * | 7/2003 | Treyz | G06Q 30/0633 705/14.64 |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,031,945 B1 | 4/2006 | Donner | |
| 7,063,263 B2 | 6/2006 | Swartz | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 * | 9/2006 | Rosenberg | G06Q 20/085 455/406 |
| 7,127,236 B2 | 10/2006 | Khan | |
| 7,200,578 B2 * | 4/2007 | Paltenghe | G06Q 20/3574 705/26.1 |
| 7,289,810 B2 | 10/2007 | Jagadeesan | |
| 7,308,254 B1 | 12/2007 | Rissanen | |
| 7,357,312 B2 | 4/2008 | Gangi | |
| 7,379,920 B2 | 5/2008 | Leung | |
| 7,383,226 B2 * | 6/2008 | Kight | G06Q 20/10 705/40 |
| 7,472,829 B2 | 1/2009 | Brown | |
| 7,482,925 B2 | 1/2009 | Hammad | |
| 7,493,284 B2 | 2/2009 | Celi et al. | |
| 7,512,567 B2 * | 3/2009 | Bemmel | G06Q 20/204 705/64 |
| 7,522,905 B2 | 4/2009 | Hammad | |
| 7,589,628 B1 * | 9/2009 | Brady, Jr. | H04L 67/306 340/8.1 |
| 7,739,596 B2 | 6/2010 | Clarke-Martin | |
| 7,783,532 B2 * | 8/2010 | Hsu | G06Q 30/0236 705/28 |
| 7,784,684 B2 * | 8/2010 | Labrou | G06Q 20/327 705/64 |
| 7,818,284 B1 * | 10/2010 | Walker | G06Q 30/0605 705/26.2 |
| 7,827,056 B2 * | 11/2010 | Walker | G06Q 20/387 705/14.1 |
| 7,870,077 B2 * | 1/2011 | Woo | G06Q 30/06 705/16 |

(56) References Cited

U.S. PATENT DOCUMENTS

| | | | |
|---|---|---|---|
| 7,979,519 B2* | 7/2011 | Shigeta | H04L 69/329 |
| | | | 709/224 |
| 8,005,426 B2* | 8/2011 | Huomo | G06Q 20/20 |
| | | | 235/441 |
| 8,019,362 B2* | 9/2011 | Sweatman | H04W 88/184 |
| | | | 455/466 |
| 8,073,424 B2* | 12/2011 | Sun | G06Q 20/326 |
| | | | 455/406 |
| 8,086,534 B2* | 12/2011 | Powell | G06Q 40/02 |
| | | | 705/64 |
| 8,109,444 B2* | 2/2012 | Jain | G06K 19/07707 |
| | | | 235/487 |
| 8,121,945 B2 | 2/2012 | Rackley | |
| 8,127,984 B2* | 3/2012 | Zatloukal | G06K 19/0723 |
| | | | 455/73 |
| 8,214,454 B1* | 7/2012 | Barnes | G06F 16/955 |
| | | | 709/217 |
| 8,429,030 B2* | 4/2013 | Walker | G06Q 30/06 |
| | | | 705/26.7 |
| 8,429,031 B2* | 4/2013 | Walker | G06Q 30/0224 |
| | | | 705/26.7 |
| 8,438,077 B2* | 5/2013 | Walker | G06Q 30/0601 |
| | | | 705/26.7 |
| 8,438,078 B2* | 5/2013 | Walker | G06Q 10/087 |
| | | | 705/26.7 |
| 8,467,766 B2* | 6/2013 | Rackley, III | G06Q 20/3221 |
| | | | 455/406 |
| 8,489,067 B2* | 7/2013 | Rackley, III | G06Q 20/3223 |
| | | | 455/406 |
| 8,510,220 B2* | 8/2013 | Rackley, III | G06Q 20/102 |
| | | | 705/40 |
| 8,566,239 B2 | 10/2013 | Arthur | |
| 8,693,995 B2 | 4/2014 | Fisher | |
| 9,183,571 B2* | 11/2015 | Kansal | H04L 67/10 |
| 9,294,917 B2 | 3/2016 | Nystrom | |
| 9,852,449 B2* | 12/2017 | Kansal | H04L 67/10 |
| 9,996,849 B2 | 6/2018 | Fisher | |
| 10,339,556 B2 | 7/2019 | Fisher | |
| 10,621,612 B2 | 4/2020 | Fisher | |
| 10,825,007 B2 | 11/2020 | Fisher | |
| 2001/0011250 A1* | 8/2001 | Paltenghe | G07F 7/08 |
| | | | 705/41 |
| 2001/0044751 A1* | 11/2001 | Pugliese, III | G06Q 30/02 |
| | | | 705/14.1 |
| 2001/0049636 A1* | 12/2001 | Hudda | G06Q 30/0601 |
| | | | 705/26.1 |
| 2002/0004855 A1* | 1/2002 | Cox | G06Q 30/02 |
| | | | 719/328 |
| 2002/0019228 A1* | 2/2002 | McKenna | H04W 8/26 |
| | | | 455/433 |
| 2002/0026423 A1* | 2/2002 | Maritzen | G06Q 20/023 |
| | | | 705/56 |
| 2002/0056091 A1* | 5/2002 | Bala | G06Q 30/0269 |
| | | | 725/23 |
| 2002/0059100 A1 | 5/2002 | Shore | |
| 2002/0060246 A1* | 5/2002 | Gobburu | G06Q 30/02 |
| | | | 235/462.46 |
| 2002/0063895 A1 | 5/2002 | Agata | |
| 2002/0065774 A1* | 5/2002 | Young | G06Q 20/322 |
| | | | 705/41 |
| 2002/0077918 A1 | 6/2002 | Lerner | |
| 2002/0082879 A1 | 6/2002 | Miller | |
| 2002/0091568 A1* | 7/2002 | Kraft | G06Q 30/0261 |
| | | | 705/14.58 |
| 2002/0099798 A1* | 7/2002 | Fedorovsky | G06F 16/9535 |
| | | | 709/219 |
| 2002/0101993 A1* | 8/2002 | Eskin | H04L 67/04 |
| | | | 380/270 |
| 2002/0107756 A1 | 8/2002 | Hammons | |
| 2002/0116269 A1* | 8/2002 | Ishida | G06Q 30/0267 |
| | | | 719/318 |
| 2002/0160761 A1* | 10/2002 | Wolfe | H04M 3/493 |
| | | | 455/566 |
| 2002/0161666 A1* | 10/2002 | Fraki | G06Q 30/0633 |
| | | | 705/26.8 |
| 2002/0164998 A1* | 11/2002 | Younis | G01S 19/06 |
| | | | 455/456.1 |
| 2002/0169664 A1* | 11/2002 | Walker | G06Q 30/0207 |
| | | | 705/26.1 |
| 2002/0169984 A1 | 11/2002 | Kumar | |
| 2002/0175955 A1* | 11/2002 | Gourdol | G06F 3/0482 |
| | | | 715/821 |
| 2003/0028426 A1* | 2/2003 | Banerjee | G06Q 30/02 |
| | | | 705/14.37 |
| 2003/0033272 A1* | 2/2003 | Himmel | G06Q 20/047 |
| 2003/0061113 A1* | 3/2003 | Petrovich | G06Q 10/087 |
| | | | 705/26.43 |
| 2003/0065805 A1 | 4/2003 | Barnes | |
| 2003/0066883 A1* | 4/2003 | Yu | G06Q 20/04 |
| | | | 235/382 |
| 2003/0069812 A1 | 4/2003 | Yuen | |
| 2003/0074259 A1* | 4/2003 | Slyman, Jr. | G06Q 30/0221 |
| | | | 705/17 |
| 2003/0085286 A1* | 5/2003 | Kelley | G07F 7/1008 |
| | | | 235/492 |
| 2003/0087601 A1* | 5/2003 | Agam | H04W 12/06 |
| | | | 455/39 |
| 2003/0093311 A1* | 5/2003 | Knowlson | H04M 15/58 |
| | | | 705/14.66 |
| 2003/0093695 A1 | 5/2003 | Dutta | |
| 2003/0105641 A1 | 6/2003 | Lewis | |
| 2003/0132298 A1* | 7/2003 | Swartz | G06Q 20/3276 |
| | | | 235/472.02 |
| 2003/0140004 A1 | 7/2003 | O'Leary | |
| 2003/0142039 A1* | 7/2003 | Minear | H04L 67/06 |
| | | | 345/2.3 |
| 2003/0149662 A1 | 8/2003 | Shore | |
| 2003/0163359 A1* | 8/2003 | Kanesaka | G06Q 30/0204 |
| | | | 705/7.33 |
| 2003/0172028 A1 | 9/2003 | Abell | |
| 2003/0208754 A1* | 11/2003 | Sridhar | H04N 21/2668 |
| | | | 348/E7.071 |
| 2003/0220839 A1* | 11/2003 | Nguyen | G06Q 30/0238 |
| | | | 705/26.1 |
| 2004/0006497 A1 | 1/2004 | Nestor | |
| 2004/0015547 A1* | 1/2004 | Griffin | H04L 67/306 |
| | | | 709/204 |
| 2004/0015548 A1* | 1/2004 | Lee | H04L 51/58 |
| | | | 709/204 |
| 2004/0030658 A1* | 2/2004 | Cruz | G06Q 20/367 |
| | | | 705/65 |
| 2004/0034544 A1 | 2/2004 | Fields | |
| 2004/0064407 A1* | 4/2004 | Kight | G06Q 20/385 |
| | | | 705/40 |
| 2004/0064408 A1* | 4/2004 | Kight | G06Q 40/06 |
| | | | 705/40 |
| 2004/0064409 A1* | 4/2004 | Kight | G06Q 20/04 |
| | | | 705/40 |
| 2004/0064410 A1* | 4/2004 | Kight | G06Q 20/385 |
| | | | 705/40 |
| 2004/0073497 A1* | 4/2004 | Hayes | G06Q 30/0601 |
| | | | 705/26.1 |
| 2004/0078329 A1* | 4/2004 | Kight | G06Q 20/0855 |
| | | | 705/40 |
| 2004/0083167 A1* | 4/2004 | Kight | G06Q 20/0855 |
| | | | 705/40 |
| 2004/0093271 A1* | 5/2004 | Walker | G06Q 30/02 |
| | | | 705/26.1 |
| 2004/0093620 A1* | 5/2004 | Iino | H04H 20/28 |
| | | | 725/32 |
| 2004/0107136 A1 | 6/2004 | Nemirofsky | |
| 2004/0111320 A1* | 6/2004 | Schlieffers | A47F 9/047 |
| | | | 705/16 |
| 2004/0127256 A1* | 7/2004 | Goldthwaite | G06K 7/0073 |
| | | | 455/466 |
| 2004/0143545 A1* | 7/2004 | Kulakowski | G06Q 20/305 |
| | | | 705/39 |

(56) References Cited

U.S. PATENT DOCUMENTS

| | | | |
|---|---|---|---|
| 2004/0172295 A1* | 9/2004 | Dahlin | G16H 10/60 705/2 |
| 2004/0203616 A1* | 10/2004 | Minear | H04L 67/04 455/566 |
| 2004/0203848 A1* | 10/2004 | Kumar | H04W 4/02 455/433 |
| 2004/0230489 A1 | 11/2004 | Goldthwaite | |
| 2004/0235450 A1* | 11/2004 | Rosenberg | H04M 1/0254 455/406 |
| 2004/0235493 A1* | 11/2004 | Ekerborn | H04W 4/02 455/466 |
| 2004/0243519 A1 | 12/2004 | Perttila | |
| 2004/0254836 A1* | 12/2004 | Emoke Barabas | G06Q 30/0267 705/14.35 |
| 2004/0267611 A1 | 12/2004 | Hoerenz | |
| 2004/0267618 A1 | 12/2004 | Judicibus | |
| 2004/0267665 A1 | 12/2004 | Nam | |
| 2005/0003810 A1 | 1/2005 | Chu | |
| 2005/0037735 A1* | 2/2005 | Coutts | G06Q 20/341 455/418 |
| 2005/0040230 A1* | 2/2005 | Swartz | G07G 1/0072 235/383 |
| 2005/0043994 A1* | 2/2005 | Walker | G06Q 30/0217 705/14.19 |
| 2005/0076210 A1 | 4/2005 | Thomas | |
| 2005/0114796 A1* | 5/2005 | Bast | G06F 3/04817 715/856 |
| 2005/0124321 A1* | 6/2005 | Kraft | G06Q 20/3415 455/414.1 |
| 2005/0131837 A1* | 6/2005 | Sanctis | G06Q 20/12 705/64 |
| 2005/0149385 A1* | 7/2005 | Trively | G06Q 30/0224 705/14.25 |
| 2005/0150945 A1* | 7/2005 | Choi | G06Q 20/108 235/379 |
| 2005/0165646 A1* | 7/2005 | Tedesco | B42D 15/00 705/14.1 |
| 2005/0187873 A1* | 8/2005 | Labrou | G06Q 20/326 705/40 |
| 2005/0190970 A1 | 9/2005 | Griffin | |
| 2005/0202385 A1 | 9/2005 | Coward | |
| 2005/0210387 A1* | 9/2005 | Alagappan | H04L 9/40 715/700 |
| 2005/0215231 A1 | 9/2005 | Bauchot | |
| 2005/0216343 A1* | 9/2005 | Tokorotani | G07F 17/40 705/14.26 |
| 2005/0222961 A1* | 10/2005 | Staib | H04M 1/0254 705/64 |
| 2005/0240484 A1* | 10/2005 | Yan | G07B 15/00 455/411 |
| 2005/0283444 A1* | 12/2005 | Ekberg | H04L 9/3242 705/67 |
| 2006/0000900 A1 | 1/2006 | Fernandes | |
| 2006/0008256 A1 | 1/2006 | Khedouri | |
| 2006/0014518 A1* | 1/2006 | Huh | H04M 15/06 455/406 |
| 2006/0031752 A1* | 2/2006 | Surloff | G06F 3/0213 707/E17.112 |
| 2006/0036488 A1* | 2/2006 | Golan | G06Q 30/02 705/14.67 |
| 2006/0044153 A1* | 3/2006 | Dawidowsky | G06K 19/0723 710/10 |
| 2006/0052086 A1* | 3/2006 | Funato | G08G 1/096827 455/411 |
| 2006/0059227 A1* | 3/2006 | Zimler | G06F 16/9577 707/E17.121 |
| 2006/0064346 A1* | 3/2006 | Steenstra | G06Q 30/0269 705/14.66 |
| 2006/0085260 A1* | 4/2006 | Yamagishi | G06Q 30/02 705/14.35 |
| 2006/0089874 A1* | 4/2006 | Newman | G06Q 10/10 705/14.32 |
| 2006/0123359 A1* | 6/2006 | Schatzberger | G06F 3/0481 715/810 |
| 2006/0135156 A1* | 6/2006 | Malu | H04W 8/18 455/432.3 |
| 2006/0136292 A1* | 6/2006 | Bhati | G06Q 30/0267 705/14.66 |
| 2006/0143091 A1* | 6/2006 | Yuan | G06Q 30/0601 705/26.1 |
| 2006/0165060 A1* | 7/2006 | Dua | G06Q 20/401 705/76 |
| 2006/0180660 A1* | 8/2006 | Gray | G06Q 20/322 455/414.1 |
| 2006/0191995 A1* | 8/2006 | Stewart | G06Q 20/02 235/382 |
| 2006/0206709 A1* | 9/2006 | Labrou | G06Q 20/18 713/167 |
| 2006/0212401 A1* | 9/2006 | Ameerally | G06Q 30/02 705/51 |
| 2006/0218092 A1* | 9/2006 | Tedesco | G06Q 20/14 705/40 |
| 2006/0219780 A1* | 10/2006 | Swartz | G07F 7/02 235/383 |
| 2006/0229998 A1 | 10/2006 | Harrison | |
| 2006/0240808 A1* | 10/2006 | Crolley | G06Q 30/0265 455/414.1 |
| 2006/0242267 A1 | 10/2006 | Grossman | |
| 2006/0253801 A1* | 11/2006 | Okaro | H04M 1/72403 715/810 |
| 2006/0287920 A1* | 12/2006 | Perkins | G06Q 30/02 707/999.107 |
| 2006/0294025 A1* | 12/2006 | Mengerink | G06Q 30/0601 705/77 |
| 2007/0004391 A1 | 1/2007 | Maffeis | |
| 2007/0011099 A1* | 1/2007 | Sheehan | G06Q 20/322 705/65 |
| 2007/0021969 A1* | 1/2007 | Homeier-Beals | G06Q 20/326 705/16 |
| 2007/0022058 A1* | 1/2007 | Labrou | G06Q 20/322 705/67 |
| 2007/0095892 A1 | 5/2007 | Lyons | |
| 2007/0015060 A1 | 6/2007 | Angelica | |
| 2007/0125838 A1* | 6/2007 | Law | G06Q 20/3223 705/65 |
| 2007/0125840 A1* | 6/2007 | Law | G06Q 20/326 705/65 |
| 2007/0138299 A1* | 6/2007 | Mitra | G06Q 20/341 235/492 |
| 2007/0145135 A1 | 6/2007 | Jogand-Coulomb | |
| 2007/0131759 A1 | 7/2007 | Cox | |
| 2007/0156436 A1* | 7/2007 | Fisher | G06Q 20/425 705/40 |
| 2007/0175978 A1* | 8/2007 | Stambaugh | G06Q 40/12 235/379 |
| 2007/0179883 A1* | 8/2007 | Questembert | G06Q 20/10 705/39 |
| 2007/0204004 A1* | 8/2007 | Coyer | H04L 65/611 709/217 |
| 2007/0210155 A1* | 9/2007 | Swartz | G06Q 20/20 235/383 |
| 2007/0235519 A1 | 10/2007 | Jang | |
| 2007/0235539 A1* | 10/2007 | Sevanto | G07F 7/1008 235/451 |
| 2007/0255662 A1 | 11/2007 | Tumminaro | |
| 2007/0262139 A1 | 11/2007 | Fiebiger | |
| 2007/0266130 A1 | 11/2007 | Mazur | |
| 2007/0270166 A1* | 11/2007 | Hampel | H04L 51/222 455/456.3 |
| 2007/0293155 A1* | 12/2007 | Liao | G06Q 20/3229 455/41.2 |
| 2008/0004952 A1* | 1/2008 | Koli | G06Q 30/0267 705/14.55 |
| 2008/0006685 A1* | 1/2008 | Rackley, III | G06Q 40/00 235/379 |

(56) References Cited

U.S. PATENT DOCUMENTS

| | | | |
|---|---|---|---|
| 2008/0010190 A1* | 1/2008 | Rackley, III | G06Q 20/3223 705/39 |
| 2008/0010191 A1* | 1/2008 | Rackley, III | G06Q 20/363 705/39 |
| 2008/0010192 A1* | 1/2008 | Rackley, III | G06Q 20/10 705/39 |
| 2008/0010193 A1* | 1/2008 | Rackley, III | G06Q 20/325 705/39 |
| 2008/0010196 A1* | 1/2008 | Rackley, III | G06Q 40/00 705/40 |
| 2008/0010204 A1* | 1/2008 | Rackley, III | G06Q 20/14 705/45 |
| 2008/0010215 A1* | 1/2008 | Rackley, III | G06Q 20/326 705/70 |
| 2008/0011825 A1* | 1/2008 | Giordano | G06Q 20/04 235/383 |
| 2008/0017704 A1* | 1/2008 | VanDeburg | G07F 7/025 235/380 |
| 2008/0027795 A1* | 1/2008 | Medlin | G06Q 20/387 705/14.23 |
| 2008/0294556 A1 | 1/2008 | Anderson | |
| 2008/0040265 A1* | 2/2008 | Rackley, III | G06Q 20/102 705/40 |
| 2008/0045172 A1* | 2/2008 | Narayanaswami | G06Q 30/02 455/187.1 |
| 2008/0046366 A1 | 2/2008 | Bemmel | |
| 2008/0048022 A1* | 2/2008 | Vawter | G06Q 20/425 235/380 |
| 2008/0051059 A1* | 2/2008 | Fisher | G06Q 20/327 455/410 |
| 2008/0051142 A1* | 2/2008 | Calvet | H04W 88/02 455/558 |
| 2008/0052192 A1* | 2/2008 | Fisher | G06Q 10/02 705/5 |
| 2008/0052233 A1* | 2/2008 | Fisher | G06Q 20/327 705/40 |
| 2008/0059329 A1* | 3/2008 | Luchene | G06Q 30/0603 705/26.81 |
| 2008/0097915 A1* | 4/2008 | Golan | G06Q 30/02 705/14.69 |
| 2008/0116264 A1 | 5/2008 | Hammad et al. | |
| 2008/0126145 A1* | 5/2008 | Rackley, III | G06Q 20/102 455/406 |
| 2008/0133336 A1* | 6/2008 | Altman | H04W 4/21 705/14.1 |
| 2008/0139155 A1 | 6/2008 | Boireau | |
| 2008/0140520 A1* | 6/2008 | Hyder | G06Q 30/0207 705/14.1 |
| 2008/0148040 A1* | 6/2008 | Machani | G06F 21/6245 713/193 |
| 2008/0167017 A1* | 7/2008 | Wentker | G06Q 30/0224 455/406 |
| 2008/0167961 A1* | 7/2008 | Wentker | G06Q 20/3278 705/14.25 |
| 2008/0167988 A1* | 7/2008 | Sun | G06Q 20/3278 455/406 |
| 2008/0172274 A1* | 7/2008 | Hurowitz | H04L 67/61 455/433 |
| 2008/0172285 A1* | 7/2008 | Hurowitz | G06Q 30/02 725/23 |
| 2008/0172291 A1* | 7/2008 | Hurowitz | G06Q 30/02 705/14.1 |
| 2008/0172292 A1* | 7/2008 | Hurowitz | G06Q 30/02 725/23 |
| 2008/0177668 A1 | 7/2008 | Delean | |
| 2008/0207234 A1* | 8/2008 | Arthur | G07F 17/16 455/466 |
| 2008/0208681 A1 | 8/2008 | Hammad | |
| 2008/0208743 A1* | 8/2008 | Arthur | G06Q 40/00 705/41 |
| 2008/0208744 A1* | 8/2008 | Arthur | G06Q 20/32 705/41 |
| 2008/0208762 A1* | 8/2008 | Arthur | G06Q 20/20 705/79 |
| 2008/0221997 A1* | 9/2008 | Wolfe | G06Q 30/02 705/14.39 |
| 2008/0242274 A1* | 10/2008 | Swanburg | H04L 67/306 455/414.1 |
| 2008/0249938 A1* | 10/2008 | Drake-Stoker | H04W 12/106 726/2 |
| 2008/0255947 A1* | 10/2008 | Friedman | G06Q 20/327 455/414.2 |
| 2008/0262928 A1* | 10/2008 | Michaelis | G06Q 30/02 705/14.39 |
| 2008/0274794 A1* | 11/2008 | Mathieson | G06Q 30/02 463/25 |
| 2008/0275779 A1* | 11/2008 | Lakshminarayanan | G06Q 20/325 705/39 |
| 2008/0305774 A1 | 12/2008 | Ramakrishna | |
| 2009/0000618 A1 | 1/2009 | Hameen-Anttila | |
| 2009/0018913 A1* | 1/2009 | Sarukkai | H04M 3/53383 705/14.56 |
| 2009/0061884 A1* | 3/2009 | Rajan | G06Q 30/0225 455/445 |
| 2009/0063312 A1* | 3/2009 | Hurst | G06Q 20/40 705/41 |
| 2009/0075592 A1 | 3/2009 | Nystrom et al. | |
| 2009/0076906 A1* | 3/2009 | Kansal | G06Q 30/0261 705/14.64 |
| 2009/0076912 A1* | 3/2009 | Rajan | G06Q 30/0267 705/14.64 |
| 2009/0098825 A1 | 4/2009 | Huomo | |
| 2009/0106112 A1* | 4/2009 | Dalmia | G06Q 40/12 709/204 |
| 2009/0112747 A1* | 4/2009 | Mullen | G06Q 40/02 705/35 |
| 2009/0124234 A1* | 5/2009 | Fisher | H04B 5/0031 455/406 |
| 2009/0132362 A1* | 5/2009 | Fisher | G06Q 30/06 705/16 |
| 2009/0143104 A1* | 6/2009 | Loh | G06Q 20/352 340/10.1 |
| 2009/0144161 A1* | 6/2009 | Fisher | G06Q 20/3821 705/16 |
| 2009/0177587 A1* | 7/2009 | Siegal | G06Q 20/10 705/67 |
| 2009/0194591 A1* | 8/2009 | Gobburu | H04H 60/48 235/462.01 |
| 2009/0227281 A1* | 9/2009 | Hammad | G06K 19/07309 340/10.1 |
| 2010/0057619 A1* | 3/2010 | Weller | G06Q 20/04 455/414.1 |
| 2010/0063895 A1* | 3/2010 | Dominguez | G06Q 20/40 705/26.1 |
| 2010/0145835 A1* | 6/2010 | Davis | G06Q 20/1085 705/30 |
| 2010/0312694 A1* | 12/2010 | Homeier-Beals | G06Q 30/02 705/39 |
| 2011/0055038 A1* | 3/2011 | Mengerink | G06Q 20/085 705/26.1 |
| 2011/0320316 A1* | 12/2011 | Randazza | G06Q 30/0617 705/26.43 |
| 2012/0030044 A1* | 2/2012 | Hurst | G06Q 20/326 705/16 |
| 2012/0150744 A1* | 6/2012 | Carlson | G06Q 20/12 705/44 |
| 2012/0215573 A1* | 8/2012 | Sussman | H04L 43/0894 705/5 |
| 2012/0220314 A1* | 8/2012 | Altman | H04L 67/306 455/456.3 |
| 2012/0265677 A1* | 10/2012 | Rackley, III | G06Q 20/325 705/41 |
| 2013/0013501 A1* | 1/2013 | Rackley, III | G06Q 20/32 705/41 |

(56) References Cited

U.S. PATENT DOCUMENTS

| | | | | |
|---|---|---|---|---|
| 2013/0054470 A1* | 2/2013 | Campos | ................ | G06Q 20/36 705/67 |
| 2013/0212016 A1* | 8/2013 | Davis | .................... | G06Q 40/12 705/42 |
| 2015/0012440 A1 | 1/2015 | Kelley | | |

FOREIGN PATENT DOCUMENTS

| | | |
|---|---|---|
| WO | WO2006/114601 | 11/2006 |
| WO | WO 2007/129081 | 11/2007 |

OTHER PUBLICATIONS

U.S. Appl. No. 15/822,131 Notice Of mailed Apr. 15, 2020, 10 p.
U.S. Appl. No. 90/019,135, Nov. 23, 2022, Fisher, filed Mar. 21, 2016.
U.S. Appl. No. 90/019,134, Nov. 23, 2022, Fisher, filed Apr. 15, 2014.
U.S. Appl. No. 14/253,648 Board Decision mailed May 13, 2020, 11.p.
U.S. Appl. No. 14/253,648 Notice Of Allowance dated Sep. 10, 2020, 11 p.
"Text Messaging" https://en.m.wikipedia.org/wiki/Text_messaging.
"Text Based User Interface" https://en.wikipedia.org/wiki/User_interface.
"WAP" https://en.wikipedia.org/wiki/Wireless_Application_Protocol.
"Multimedia messaging" https://en.wikipedia.org/wiki/Multimedia_Messaging_Service#Technical_description.
Web based user interface https://en.wikipedia.org/wiki/User_interface.
Ajax https://techterms.com/definition/ajax.
Java script https://techterms.com/definition/javascript.
"Browser games" www.60freegames.com/Free-to-Play/Browser-Games.
"Text-based games" https://en.wikipedia.org/wiki/Text-based game.
"Online shopping" https://en.wikipedia.org/wiki/Online_shopping.
"Social networking services" https://en.wikipedia.org/wiki/Social_networking_service.
"Web mapping" https://en.wikipedia.org/wiki/Web_mapping.
"Mobile browser" https://en.wikipedia.org/wiki/Mobile_browser.
"Voice browser" https://en.wikipedia.org/wiki/Voice_browser.
"Email" https://techterms.com/definition/email.
"Web mail" https://en.wikipedia.org/wiki/Webmail ).
"WAP Browser" https://en.m.wikipedia.org/wiki/Wireless_Application_Protocol.
"Binary application" https://en.m.wikipedia.org/wiki/Application_binary_interface.
IPR2021-01529.
PTAB Decision Denying institution of IPR2021-01529.
IPR2021-01530.
PTAB Decision Denying institution of IPR2021-01530.

* cited by examiner

METHOD AND SYSTEM FOR REMOTE TRANSACTION PROCESSING USING A NON-BROWSER BASED APPLICATION

CROSS-REFERENCE TO RELATED APPLICATIONS

This application is a continuation and claims priority to U.S. application Ser. No. 15/822,131 filed Nov. 25, 2017 titled REMOTE TRANSACTION PROCESSING WITH AUTHENTICATION FROM A NON-BROWSER BASED APPLICATION which claims priority to U.S. application Ser. No. 14/686,695 filed Apr. 14, 2015 titled INDUCTION BASED TRANSACTION AT A TRANSACTION SERVER now U.S. Pat. No. 9,836,731 issued on Dec. 5, 2017 which is a continuation and claims priority to U.S. application Ser. No. 13/710,646, filed Dec. 11, 2012 now U.S. Pat. No. 9,015,064 issued on Apr. 21, 2015 titled UTILIZING A SECURE ELEMENT FOR NFC TRANSACTIONS WHICH INCLUDES RESPONSE DATA DURING INDUCTION which is a continuation and claims priority to U.S. application Ser. No. 11/948,903, filed Nov. 30, 2007 now U.S. Pat. No. 8,352,323 issued on Jan. 8, 2013 titled CONDUCTING AN ONLINE PAYMENT TRANSACTION USING AN NFC MOBILE COMMUNICATION DEVICE, all of which is incorporated by reference herein in its entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel", both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device can be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
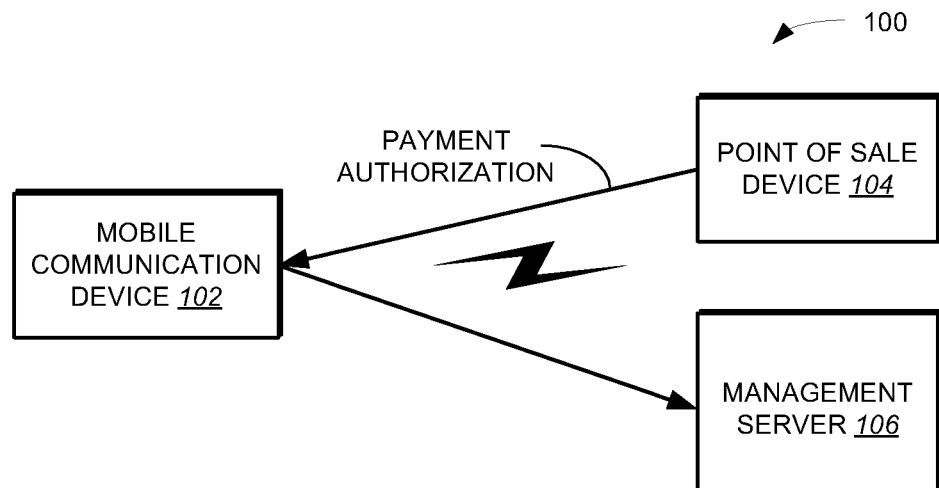
FIG. 1 illustrates a block diagram of a communication system including a wireless mobile communication device and a management server in accordance with one implementation.

FIG. 1 illustrates one implementation of a communication system 100. The communication system 100 includes a hand-held, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions. Payment transactions can include, for example, using contactless payment technology at a retail merchant point of sale (e.g., through point of sale device 104), using mobile/internet commerce (e.g., purchase tickets and products, etc.), storage of payment information and other digital artifacts (e.g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
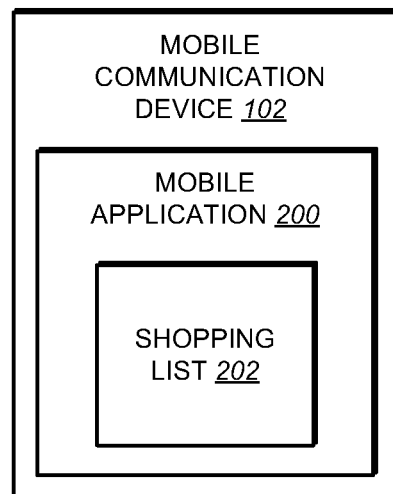
FIG. 2 illustrates one implementation of the wireless mobile communication device of FIG. 1.

FIG. 2 illustrates one implementation of the mobile communication device 102. The mobile communication device 102 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, CA. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944,267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
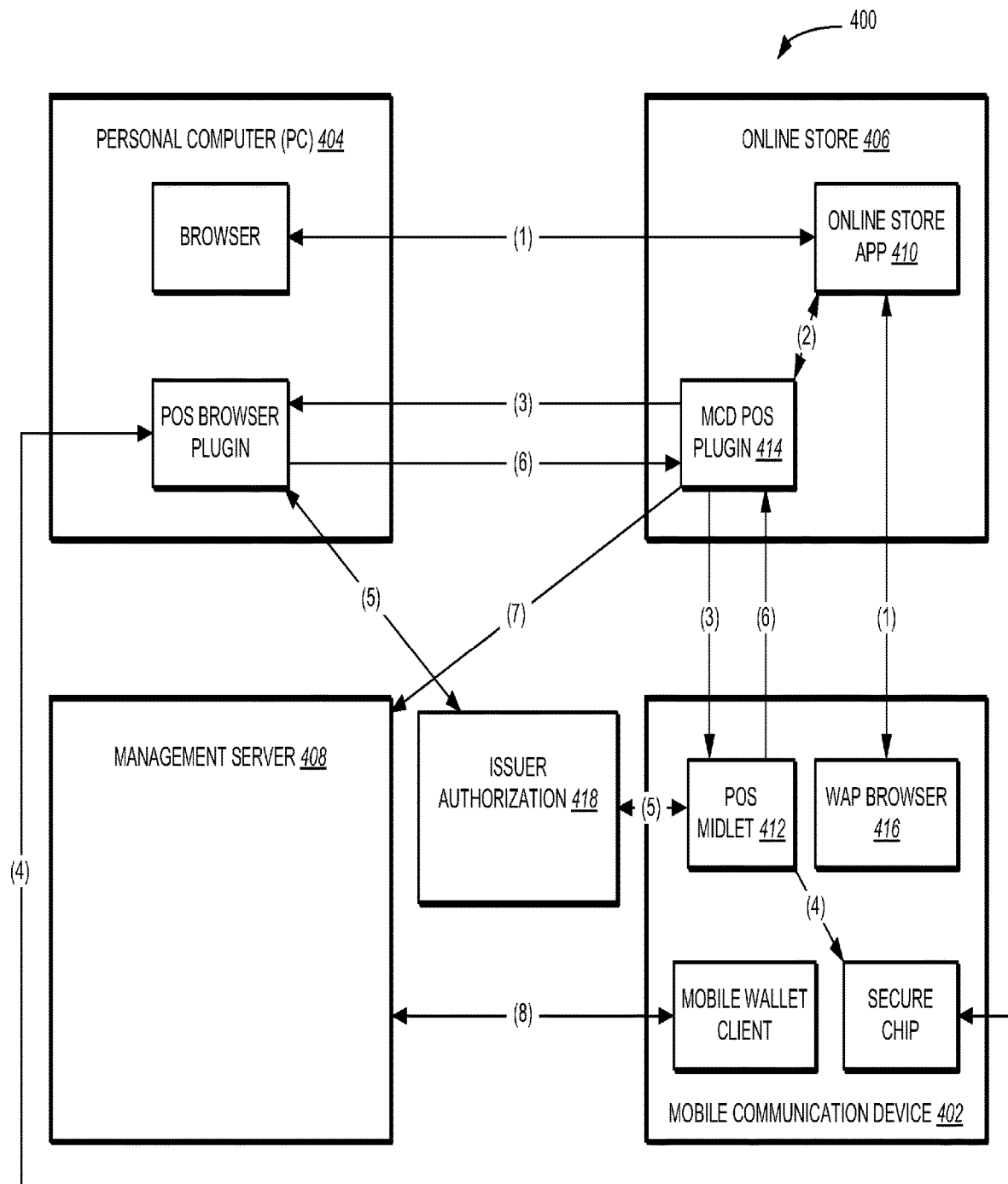
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the PC, which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implementation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
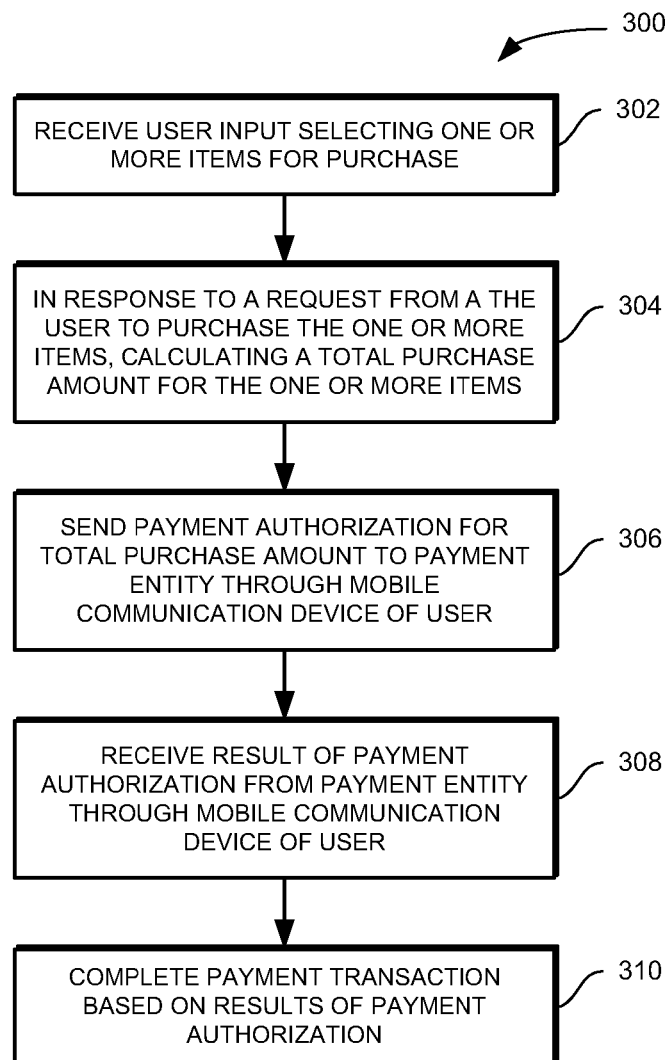
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e.g., at the point of sale device) (step 302). In general, the transaction being made at the point of sale device can be any type of transaction that involves the exchange or transfer of funds—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (POS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPS, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 5:
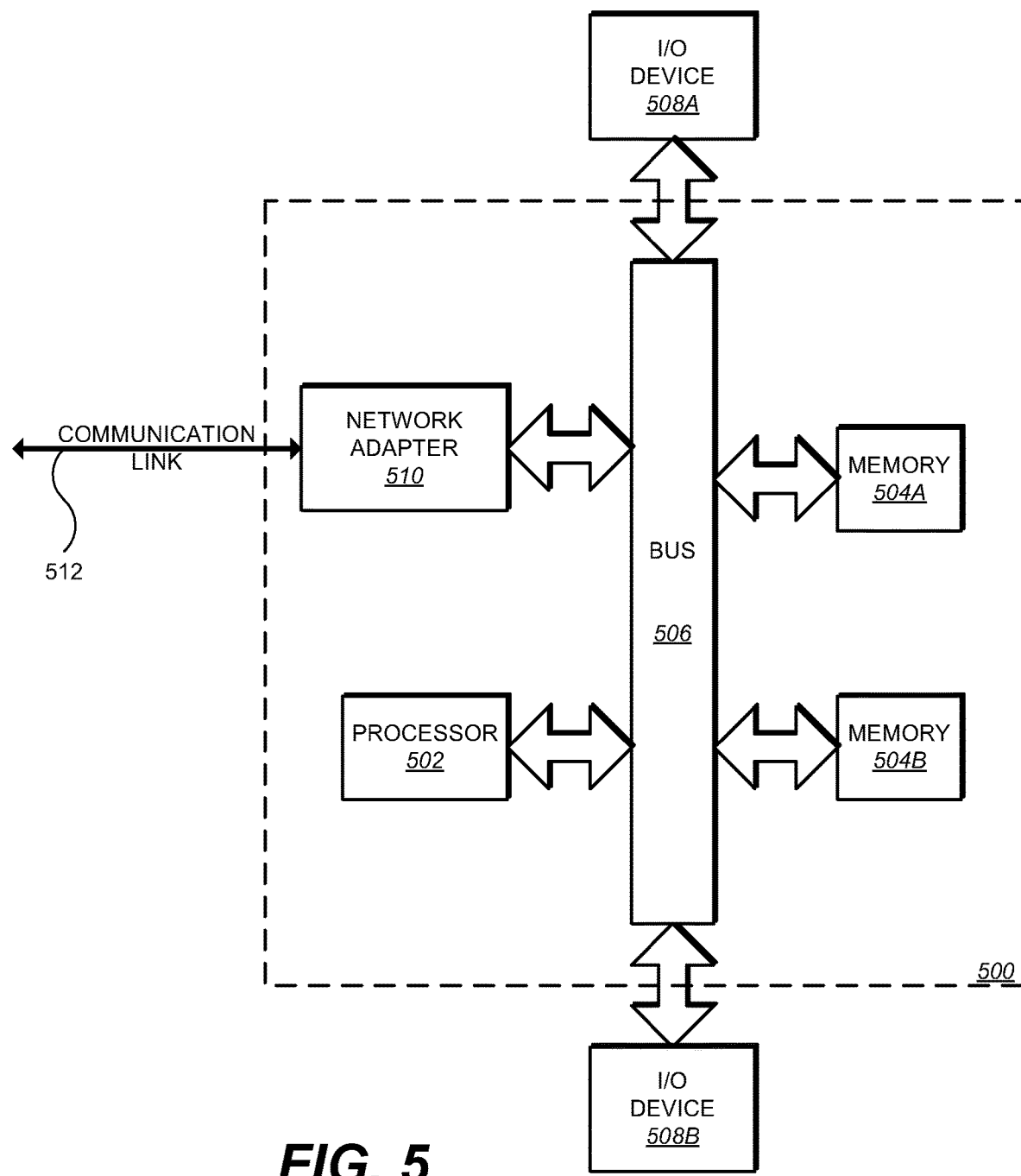
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for processing a remote transaction received from a non-browser based application comprising:
    receiving, at the non-browser based application, information related to a userID information related to a password, wherein the non-browser based application is a mobile operating system platform based mobile application with a graphical user interface that is preinstalled or downloaded and installed on a mobile device, wherein the graphical user interface includes a graphical icon, the mobile device including a mobile device display, a mobile device processor, a mobile device memory, a mobile device radio transceiver that supports voice and data interactions through a first communication channel, and a mobile device wireless fidelity (Wi-Fi) transceiver;
    transmitting, from the non-browser based application, the information related to the userID and the information related to the password to a remote management server;
    receiving, at the mobile device, information authenticating the user associated with the information related to the userID and the information related to the password from the remote management server;
    after user authentication, receiving a list of products from the remote management server at the non-browser based application for display using the non-browser based application;
    receiving, at the non-browser based application an identification of one or more products selected from the list of products, wherein the non-browser based application receives the identification of one or more products selected from the list of products through the user input via the mobile device display of the mobile device;
    transmitting from the non-browser based application to the remote management server the identification of one or more products selected from the list of products;
    receiving, from the non-browser based application, a transaction purchase request, wherein the non-browser based application receives the transaction purchase request through the user input via the mobile device display of the mobile device;
    transmitting, from the non-browser based application, the transaction purchase request to the remote management server;
    after the remote transaction has been processed by a transaction server using a payment method, receiving at the non-browser based application, a digital artifact from the remote management server; and
    displaying the digital artifact within the non-browser based application.

2. The method of claim 1, wherein the payment method is a credit card, debit card, or prepaid card.

3. The method of claim 1, wherein the digital artifact comprises an advertisement, receipt, ticket, coupon, media, metadata, and/or content.

4. The method of claim 1, further wherein data stored on the mobile device is encrypted using a mobile operating system native to the mobile device.

5. The method of claim 1, wherein the information related to the password is information related to a personal identification number (PIN).

6. The method of claim 1, wherein the information related to the password, is information related to biometric data.

7. The method of claim 1, wherein no sensitive information is stored on the mobile device.

8. The method of claim 7, wherein the sensitive information comprises at least one of information related to the payment method.

9. The method of claim 1, further wherein the non-browser based application generates an alert if it has not received the digital artifact from the remote management server within a certain period of time.

10. The method of claim 1, further wherein the non-browser based application displays the digital artifact while the mobile device maintains a connection to a wireless network; and
    further comprises:
    losing the connection of the mobile device to the wireless network while the non-browser based application displays the digital artifact; and in an offline mode, after losing the connection, continuing to display the digital artifact within the non-browser based application.

11. The method of claim 1, further wherein upon the condition that the mobile device loses connection with a wireless network the non-browser based application monitors for access to the wireless network and automatically re-connects to the wireless network when the wireless network is available.

12. The method of claim 1, further wherein the non-browser based application sends a request to the remote management server for retransmission of the digital artifact if it has not received the digital artifact from the remote management server within a certain period of time.

13. The method of claim 1, further wherein the non-browser based application automatically displays the digital artifact in an easily retrievable format.

14. The method of claim 1, further wherein the non-browser based application is configured to use a structured format, wherein the structured format means the non-browser based application can store and display the digital artifact in an organized manner.

15. A mobile device for processing a remote transaction received from a non-browser based application compromising a mobile device input interface configured to:
receive, at the non-browser based application information related to a userID and information related to a password, wherein the non-browser based application is a mobile operating system platform based mobile application with a graphical user interface that is preinstalled or downloaded and installed on the mobile device, wherein the graphical user interface includes a graphical icon, the mobile device including a mobile device display, a mobile device processor, a mobile device memory, a mobile device radio transceiver that supports voice and data interactions through a first communication channel, and a mobile device wireless fidelity (Wi-Fi) transceiver;
receive information authenticating the user associated with the information related to the userID and the information related to the password from the remote management server;
after user authentication, receive a list of products from the remote management server at the non-browser based application for display using the non-browser based application;
receive, at the non-browser based application an identification of one or more products selected from the list of products, wherein the non-browser based application receives the identification of one or more products selected from the list of products through the user input via the mobile device display of the mobile device;
receive, at the non-browser based application, a transaction purchase request, wherein the non-browser based application receives the transaction purchase request through the user input via the mobile device display of the mobile device;
after the remote transaction has been processed by a transaction server using a payment method, receiving at the non-browser based application, a digital artifact from the remote management server;
a mobile device output interface configured to:
transmit, from the non-browser based application the information related to the userID and information related to the password to the remote management server;
transmit from the non-browser based application to the remote management server the identification of one or more products selected from the list of products;
transmit, from the non-browser based application, the transaction purchase request to the remote management server;
a mobile device display configured to display the digital artifact within the non-browser based application.

16. The mobile device of claim 15, wherein the payment method is a credit card, debit card, or prepaid card.

17. The mobile device of claim 15, wherein the digital artifact comprises an advertisement, receipt, ticket, coupon, media, metadata, and/or content.

18. The mobile device of claim 15, further wherein data stored on the mobile device is encrypted using a mobile operating system native to the mobile device.

19. The mobile device of claim 15, wherein the information related to the password is information related to a personal identification number (PIN).

20. The mobile device of claim 15, wherein the information related to the password, is information related to biometric data.

21. The mobile device of claim 15, wherein no sensitive information is stored on the mobile device.

22. The mobile device of claim 21, wherein the sensitive information comprises at least one of information related to the payment method.

23. The mobile device of claim 15, further wherein the non-browser based application generates an alert if it has not received the digital artifact from the remote management server within a certain period of time.

24. The mobile device of claim 15, further wherein the non-browser based application displays the digital artifact while the mobile device maintains a connection to a wireless network; and
further comprises:
losing the connection of the mobile device to the wireless network while the non-browser based application displays the digital artifact; and
in an offline mode, after losing the connection, continuing to display the digital artifact within the non-browser based application.

25. The mobile device of claim 15, further wherein upon the condition that the mobile device loses connection with a wireless network the non-browser based application monitors for access to the wireless network and automatically re-connects to the wireless network when the wireless network is available.

26. The mobile device of claim 15, further wherein the non-browser based application sends a request to the remote management server for retransmission of the digital artifact if it has not received the digital artifact from the remote management server within a certain period of time.

27. The mobile device of claim 15, further wherein the non-browser based application automatically displays the digital artifact in an easily retrievable format.

28. The mobile device of claim 15, further wherein the non-browser based application is configured to use a structured format, wherein the structured format means the non-browser based application can store and display the digital artifact in an organized manner.

29. The method of claim 1, further wherein the remote management server is configured to store the user ID for a plurality of the user's mobile devices and further wherein the configuration means that the remote management server scales.

30. The method of claim 1, further wherein the digital artifact is stored in the mobile device memory due to reasons of performance, usability, user experience, and user convenience.

31. The method of claim 1, further wherein maintaining the payment method at the remote management server results in a more secure system.

32. The method of claim 1, further wherein the transaction does not use a Point-Of-Sale terminal.

33. The method of claim 1, further wherein the non-browser based application is stored in a local mobile device memory during execution of the non-browser based application, a bulk storage mobile device memory when the non-browser based application is not being executed, and a cache mobile device memory to provide temporary storage of at least some of the non-browser based application in order to reduce the number of times the non-browser based application must be retrieved from the bulk storage mobile device memory during the execution.

34. The method of claim 1, wherein the non-browser based application is not Short Messaging Service (SMS).

35. The mobile device of claim 15, further wherein the remote management server is configured to store the user ID for a plurality of the user's mobile devices and further wherein the configuration means that the remote management server scales.

36. The mobile device of claim 15, further wherein the digital artifact is stored in the mobile device memory due to reasons of performance, usability, user experience, and user convenience.

37. The mobile device of claim 15, further wherein maintaining the payment method at the remote management server results in a more secure system.

38. The mobile device of claim 15, further wherein the transaction does not use a Point-Of-Sale terminal.

39. The mobile device of claim 15, further wherein the non-browser based application is stored in a local mobile device memory during execution of the non-browser based application, a bulk storage mobile device memory when the non-browser based application is not being executed, and a cache mobile device memory to provide temporary storage of at least some of the non-browser based application in order to reduce the number of times the non-browser based application must be retrieved from the bulk storage mobile device memory during the execution.

40. The mobile device of claim 15, wherein the non-browser based application is not Short Messaging Service (SMS).

* * * * *